(12) United States Patent
Stranberg

(10) Patent No.: US 11,338,503 B2
(45) Date of Patent: May 24, 2022

(54) SYSTEM FOR ADDITIVELY MANUFACTURING COMPOSITE STRUCTURE

(71) Applicant: Continuous Composites Inc., Coeur d'Alene, ID (US)

(72) Inventor: Nathan Andrew Stranberg, Post Falls, ID (US)

(73) Assignee: Continuous Composites Inc., Coeur d'Alene, ID (US)

(*) Notice: Subject to any disclaimer, the term of this patent is extended or adjusted under 35 U.S.C. 154(b) by 216 days.

(21) Appl. No.: 16/752,257

(22) Filed: Jan. 24, 2020

(65) Prior Publication Data

US 2020/0238606 A1 Jul. 30, 2020

Related U.S. Application Data

(60) Provisional application No. 62/797,078, filed on Jan. 25, 2019.

(51) Int. Cl.
*B29C 64/188* (2017.01)
*B29C 64/118* (2017.01)
(Continued)

(52) U.S. Cl.
CPC .......... *B29C 64/118* (2017.08); *B29C 64/106* (2017.08); *B29C 64/165* (2017.08);
(Continued)

(58) Field of Classification Search
CPC ... B29C 64/106; B29C 64/118; B29C 64/165; B29C 64/188; B29C 64/209;
(Continued)

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 2589481 B1 1/2016
(Continued)

OTHER PUBLICATIONS

International Search Report dated May 18, 2020 for PCT/US2020/015125 to Continuous Composites Inc., Filed Jan. 25, 2020.
(Continued)

*Primary Examiner* — Joseph S Del Sole
*Assistant Examiner* — Manley L Cummins, IV
(74) *Attorney, Agent, or Firm* — Ryan C. Stockett

(57) ABSTRACT

An additive manufacturing system is disclosed for use in fabricating a structure. The additive manufacturing system may include a support, and an outlet configured to discharge a material. The outlet may be operatively connected to and moveable by the support in a normal travel direction during material discharge. The outlet may include a guide, and a compactor operatively connected to the guide at a trailing location relative to the normal travel direction. The compactor may be moveable in an axial direction of the guide. The outlet may also include at least one cure enhancer mounted to move with the compactor relative to the guide. The at least one cure enhancer may be configured to expose the material to a cure energy.

19 Claims, 3 Drawing Sheets

(51) Int. Cl.

| | |
|---|---|
| *B29C 64/218* | (2017.01) |
| *B29C 64/241* | (2017.01) |
| *B29C 64/264* | (2017.01) |
| *B29C 64/314* | (2017.01) |
| *B29C 64/209* | (2017.01) |
| *B29C 64/393* | (2017.01) |
| *B29C 64/165* | (2017.01) |
| *G06F 30/23* | (2020.01) |
| *B29C 64/227* | (2017.01) |
| *B29C 64/106* | (2017.01) |
| *B29C 64/245* | (2017.01) |
| *B29C 64/295* | (2017.01) |
| *B33Y 40/00* | (2020.01) |
| *B33Y 10/00* | (2015.01) |
| *B33Y 30/00* | (2015.01) |
| *B33Y 50/02* | (2015.01) |
| *G06F 113/10* | (2020.01) |
| *B33Y 70/10* | (2020.01) |
| *B29K 105/08* | (2006.01) |

(52) U.S. Cl.
CPC .......... B29C 64/188 (2017.08); B29C 64/209 (2017.08); B29C 64/218 (2017.08); B29C 64/227 (2017.08); B29C 64/241 (2017.08); B29C 64/245 (2017.08); B29C 64/264 (2017.08); B29C 64/295 (2017.08); B29C 64/314 (2017.08); B29C 64/393 (2017.08); G06F 30/23 (2020.01); *B29K 2105/08* (2013.01); *B33Y 10/00* (2014.12); *B33Y 30/00* (2014.12); *B33Y 40/00* (2014.12); *B33Y 50/02* (2014.12); *B33Y 70/10* (2020.01); *G06F 2113/10* (2020.01)

(58) Field of Classification Search
CPC ... B29C 64/218; B29C 64/227; B29C 64/264; B29C 64/314; B29C 64/336; B29C 64/393; B29C 70/16; B29C 70/38; B29K 2105/08; B33Y 10/00; B33Y 30/00; B33Y 40/00

See application file for complete search history.

(56) References Cited

U.S. PATENT DOCUMENTS

| | | |
|---|---|---|
| 3,984,271 A | 10/1976 | Gilbu |
| 3,993,726 A | 11/1976 | Moyer |
| 4,643,940 A | 2/1987 | Shaw et al. |
| 4,671,761 A | 6/1987 | Adrian et al. |
| 4,822,548 A | 4/1989 | Hempel |
| 4,851,065 A | 7/1989 | Curtz |
| 4,938,824 A * | 7/1990 | Youngkeit ............... F02K 9/97 156/173 |
| 5,002,712 A | 3/1991 | Goldmann et al. |
| 5,037,691 A | 8/1991 | Medney et al. |
| 5,296,335 A | 3/1994 | Thomas et al. |
| 5,340,433 A | 8/1994 | Crump |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2005/0006803 A1 | 1/2005 | Owens |
| 2005/0061422 A1 | 3/2005 | Martin |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth |
| 2012/0060468 A1 | 3/2012 | Dushku et al. |
| 2012/0159785 A1 | 6/2012 | Ai. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0108677 A1* | 4/2015 | Mark .................... B29C 64/106 425/375 |
| 2015/0136455 A1 | 5/2015 | Fleming |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0297104 A1 | 10/2016 | Guillemette et al. |
| 2016/0311165 A1 | 10/2016 | Mark et al. |

(56) References Cited

U.S. PATENT DOCUMENTS

| | | |
|---|---|---|
| 2016/0325491 A1 | 11/2016 | Sweeney et al. |
| 2016/0332369 A1 | 11/2016 | Shah |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kune et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2017/0341300 A1* | 11/2017 | Rudolph ............... B29C 64/386 |
| 2018/0126639 A1 | 5/2018 | Tyler |
| 2018/0207850 A1* | 7/2018 | Stockett ................. B29C 48/08 |
| 2019/0001562 A1 | 1/2019 | Stockett et al. |

FOREIGN PATENT DOCUMENTS

| | | |
|---|---|---|
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Di. Pietro & Paul Compston, Resin Hardness and interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by

(56) References Cited

OTHER PUBLICATIONS

Layer, Journal of Applied Polymer Science, vol. 123, Issue 6, pp. 3799-3805 (May 15, 2012).

* cited by examiner

SYSTEM FOR ADDITIVELY MANUFACTURING COMPOSITE STRUCTURE

RELATED APPLICATION

This application is based on and claims the benefit of priority from U.S. Provisional Application No. 62/797,078 that was filed on Jan. 25, 2019, the contents of which are expressly incorporated herein by reference.

TECHNICAL FIELD

The present disclosure relates generally to a manufacturing system and, more particularly, to a system for additively manufacturing composite structures.

BACKGROUND

Continuous fiber 3D printing (a.k.a., CF3D®) involves the use of continuous fibers embedded within a matrix discharging from a moveable print head. The matrix can be a traditional thermoplastic, a powdered metal, a liquid resin (e.g., a UV curable and/or two-part resin), or a combination of any of these and other known matrixes. Upon exiting the print head, a head-mounted cure enhancer (e.g., a UV light, an ultrasonic emitter, a heat source, a catalyst supply, etc.) is activated to initiate and/or complete curing of the matrix. This curing occurs almost immediately, allowing for unsupported structures to be fabricated in free space. When fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

Although CF3D® provides for increased strength, compared to manufacturing processes that do not utilize continuous fiber reinforcement, improvements can be made to the structure and/or operation of existing systems. For example, Applicant has found that greater control over compacting and curing of the reinforcement can improve reinforcement placement, strength, and accuracy. The disclosed additive manufacturing system is uniquely configured to provide these improvements and/or to address other issues of the prior art.

SUMMARY

In one aspect, the present disclosure is directed to an additive manufacturing system. The additive manufacturing system may include a support, and an outlet configured to discharge a material. The outlet may be operatively connected to and moveable by the support in a normal travel direction during material discharge. The outlet may include a guide, and a compactor operatively connected to the guide at a trailing location relative to the normal travel direction. The compactor may be moveable in an axial direction of the guide. The outlet may also include at least one cure enhancer mounted to move with the compactor relative to the guide. The at least one cure enhancer may be configured to expose the material to a cure energy.

In another aspect, the present disclosure is directed to another additive manufacturing system. This additive manufacturing system may include a nozzle configured to discharge continuous reinforcement at least partially wetted with a matrix, at least one cure enhancer configured to expose the matrix to a cure energy after discharge from the nozzle, and a compactor configured to apply a pressure to the matrix-wetted continuous reinforcement after discharge from the nozzle. The at least one cure enhancer and the compactor may be mounted to move together relative to the nozzle, in a direction of discharge from the nozzle.

In yet another aspect, the present disclosure is directed to a method of additively manufacturing a structure. The method may include wetting a continuous reinforcement with a liquid matrix inside of a print head, and discharging the matrix-wetted continuous reinforcement through an outlet of the print head. The method may also include pressing a compactor against the matrix-wetted continuous reinforcement after discharging, directing cure energy from at least one cure enhancer toward the matrix-wetted continuous reinforcement after pressing, and moving the at least one cure enhancer with the compactor relative to the outlet in a direction of discharging.

DETAILED DESCRIPTION

Figure 1:
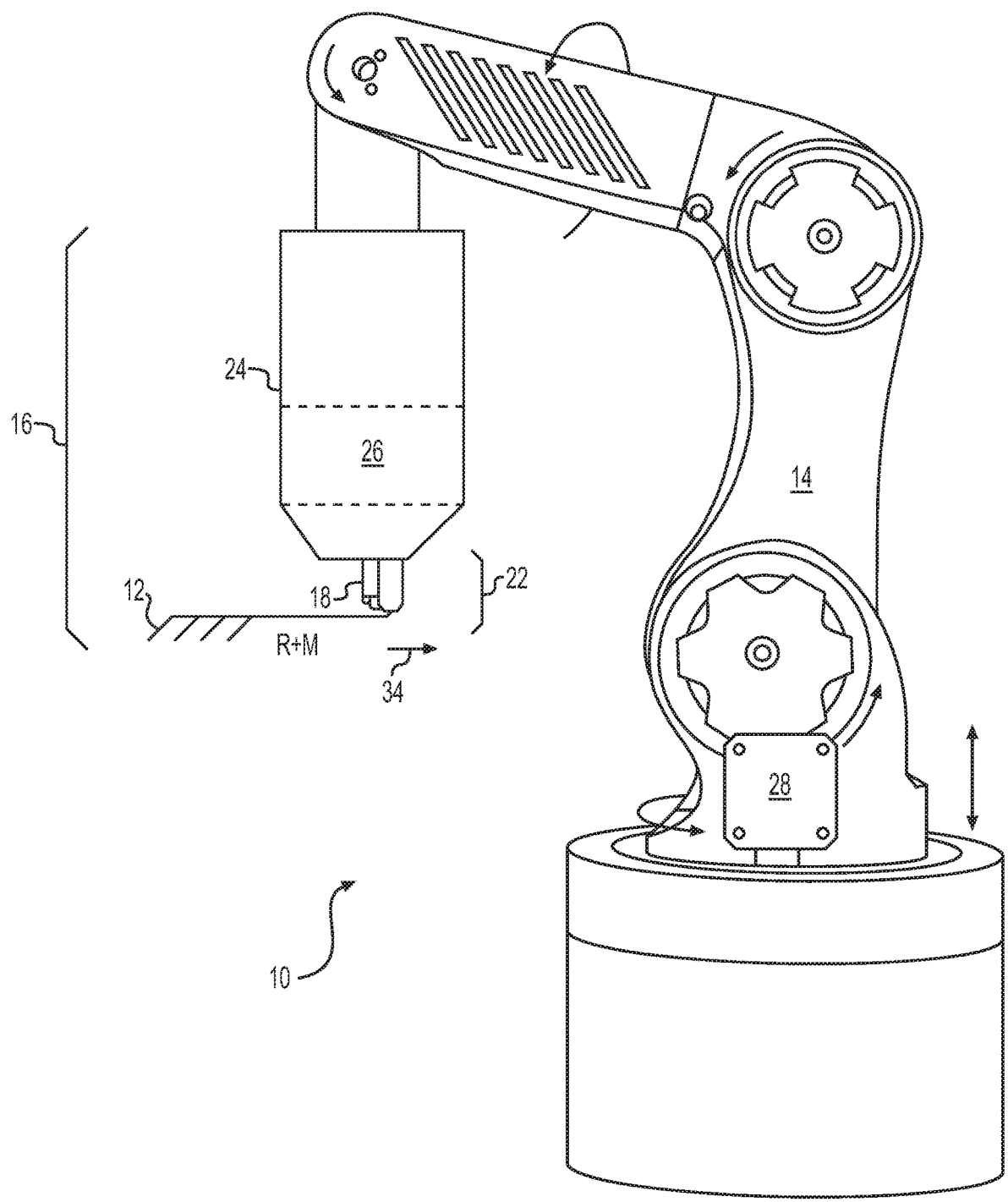
FIG. 1 is a diagrammatic illustration of an exemplary disclosed additive manufacturing system.

FIG. 1 illustrates an exemplary system 10, which may be used to manufacture a composite structure 12 having any desired shape. System 10 may include a support 14 and deposition head ("head") 16. Head 16 may be coupled to and moved by support 14. In the disclosed embodiment of FIG. 1, support 14 is a robotic arm capable of moving head 16 in multiple directions during fabrication of structure 12. Support 14 may alternatively embody a gantry (e.g., an overhead-bridge or single-post gantry) or a hybrid gantry/arm also capable of moving head 16 in multiple directions during fabrication of structure 12. Although support 14 is shown as being capable of 6-axis movements, it is contemplated that support 14 may be capable of moving head 16 in a different manner (e.g., along or around a greater or lesser number of axes). In some embodiments, a drive may mechanically couple head 16 to support 14, and include components that cooperate to move portions of and/or supply power or materials to head 16.

Head 16 may be configured to receive or otherwise contain a matrix (shown as M). The matrix may include any types or combinations of materials (e.g., a liquid resin, such as a zero-volatile organic compound resin, a powdered metal, etc.) that are curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized (e.g., positively and/or negatively), for example by an external device (e.g., by an extruder, a pump, etc.—not shown) that is fluidly connected to head 16 via a corresponding conduit (not shown). In another embodiment, however, the pressure may be generated completely inside of head 16 by a similar type of device. In yet other embodiments, the matrix may be gravity-fed into and/or through head 16. For example, the matrix may be fed into head 16, and pushed or pulled out of head 16 along with one or more continuous reinforcements (shown as R). In some instances, the matrix inside head 16 may need to be kept cool and/or dark in order to inhibit premature curing or otherwise obtain a desired rate of curing after discharge. In other instances, the matrix may need to be kept warm and/or illuminated for similar reasons. In either situation, head 16 may be specially configured (e.g., insulated, temperature-controlled, shielded, etc.) to provide for these needs.

The matrix may be used to at least partially coat any number of continuous reinforcements (e.g., separate fibers, tows, rovings, socks, and/or sheets of continuous material) and, together with the reinforcements, make up a portion (e.g., a wall) of composite structure 12. The reinforcements may be stored within or otherwise passed through head 16. When multiple reinforcements are simultaneously used, the reinforcements may be of the same material composition and have the same sizing and cross-sectional shape (e.g., circular, square, rectangular, etc.), or a different material composition with different sizing and/or cross-sectional shapes. The reinforcements may include, for example, carbon fibers, vegetable fibers, wood fibers, mineral fibers, glass fibers, plastic fibers, metallic fibers, optical fibers (e.g., tubes), etc. It should be noted that the term "reinforcement" is meant to encompass both structural and non-structural (e.g., functional) types of continuous materials that are at least partially encased in the matrix discharging from head 16.

The reinforcements may be at least partially coated with the matrix while the reinforcements are inside head 16, while the reinforcements are being passed to head 16, and/or while the reinforcements are discharging from head 16. The matrix, dry (e.g., unimpregnated) reinforcements, and/or reinforcements that are already exposed to the matrix (e.g., pre-impregnated reinforcements) may be transported into head 16 in any manner apparent to one skilled in the art. In some embodiments, a filler material (e.g., chopped fibers, nano particles or tubes, etc.) and/or additives (e.g., thermal initiators, UV initiators, etc.) may be mixed with the matrix before and/or after the matrix coats the continuous reinforcements.

One or more cure enhancers (e.g., a UV light, an ultrasonic emitter, a laser, a heater, a catalyst dispenser, etc.) 18 may be mounted proximate (e.g., within, on, and/or adjacent) head 16 and configured to enhance a cure rate and/or quality of the matrix as it is discharged from head 16. Cure enhancer 18 may be controlled to selectively expose portions of structure 12 to energy (e.g., UV light, electromagnetic radiation, vibrations, heat, a chemical catalyst, etc.) during material discharge and the formation of structure 12. The energy may trigger a chemical reaction to occur within the matrix, increase a rate of the chemical reaction, sinter the matrix, harden the matrix, solidify the matrix, polymerize the matrix, or otherwise cause the matrix to cure as it discharges from head 16. The amount of energy produced by cure enhancer 18 may be sufficient to cure the matrix before structure 12 axially grows more than a predetermined length away from head 16. In one embodiment, structure 12 is at least partially (e.g., completely) cured before the axial growth length becomes equal to an external diameter of the matrix-coated reinforcement.

The matrix and/or reinforcement may be discharged together from head 16 via any number of different modes of operation. In a first example mode of operation, the matrix and/or reinforcement are extruded (e.g., pushed under pressure and/or mechanical force) from head 16 as head 16 is moved by support 14 to create features of structure 12. In a second example mode of operation, at least the reinforcement is pulled from head 16, such that a tensile stress is created in the reinforcement during discharge. In this second mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16 with the reinforcement, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 16 as a result of head 16 being moved by support 14 away from an anchor point (e.g., a print bed, an existing surface of structure 12, a fixture, etc.). For example, at the start of structure formation, a length of matrix-impregnated reinforcement may be pulled and/or pushed from head 16, deposited onto the anchor point, and at least partially cured, such that the discharged material adheres (or is otherwise coupled) to the anchor point. Thereafter, head 16 may be moved away from the anchor point, and the relative movement may cause the reinforcement to be pulled from head 16. As will be explained in more detail below, the movement of reinforcement through head 16 may be selectively assisted via one or more internal feed mechanisms, if desired. However, the discharge rate of reinforcement from head 16 may primarily be the result of relative movement between head 16 and the anchor point, such that tension is created within the reinforcement. As discussed above, the anchor point could be moved away from head 16 instead of or in addition to head 16 being moved away from the anchor point.

Head 16 may include, among other things, an outlet 22 and a matrix reservoir 24 located upstream of outlet 22. In one example, outlet 22 is a single-channel outlet configured to discharge composite material having a generally circular, tubular, or rectangular cross-section. The configuration of head 16, however, may allow outlet 22 to be swapped out for another outlet that discharges multiple channels of composite material having different shapes (e.g., a flat or sheet-like cross-section, a multi-track cross-section, etc.). Fibers, tubes, and/or other reinforcements may pass through matrix reservoir 24 (e.g., through one or more internal wetting mechanisms 26 located inside of reservoir 24) and be wetted (e.g., at least partially coated and/or fully saturated) with matrix prior to discharge.

One or more controllers 28 may be provided and communicatively coupled with support 14 and head 16. Each controller 28 may embody a single processor or multiple processors that are programmed and/or otherwise configured to control an operation of system 10. Controller 28 may include one or more general or special purpose processors or microprocessors. Controller 28 may further include or be associated with a memory for storing data such as, for example, design limits, performance characteristics, operational instructions, tool paths, and corresponding parameters of each component of system 10. Various other known circuits may be associated with controller 28, including power supply circuitry, signal-conditioning circuitry, solenoid driver circuitry, communication circuitry, and other appropriate circuitry. Moreover, controller 28 may be capable of communicating with other components of system 10 via wired and/or wireless transmission.

One or more maps may be stored within the memory of controller 28 and used during fabrication of structure 12.

Each of these maps may include a collection of data in the form of lookup tables, graphs, and/or equations. In the disclosed embodiment, the maps may be used by controller 28 to determine movements of head 16 required to produce desired geometry (e.g., size, shape, material composition, performance parameters, and/or contour) of structure 12, and to regulate operation of cure enhancer(s) 18 and/or other related components in coordination with the movements.

Figure 2:
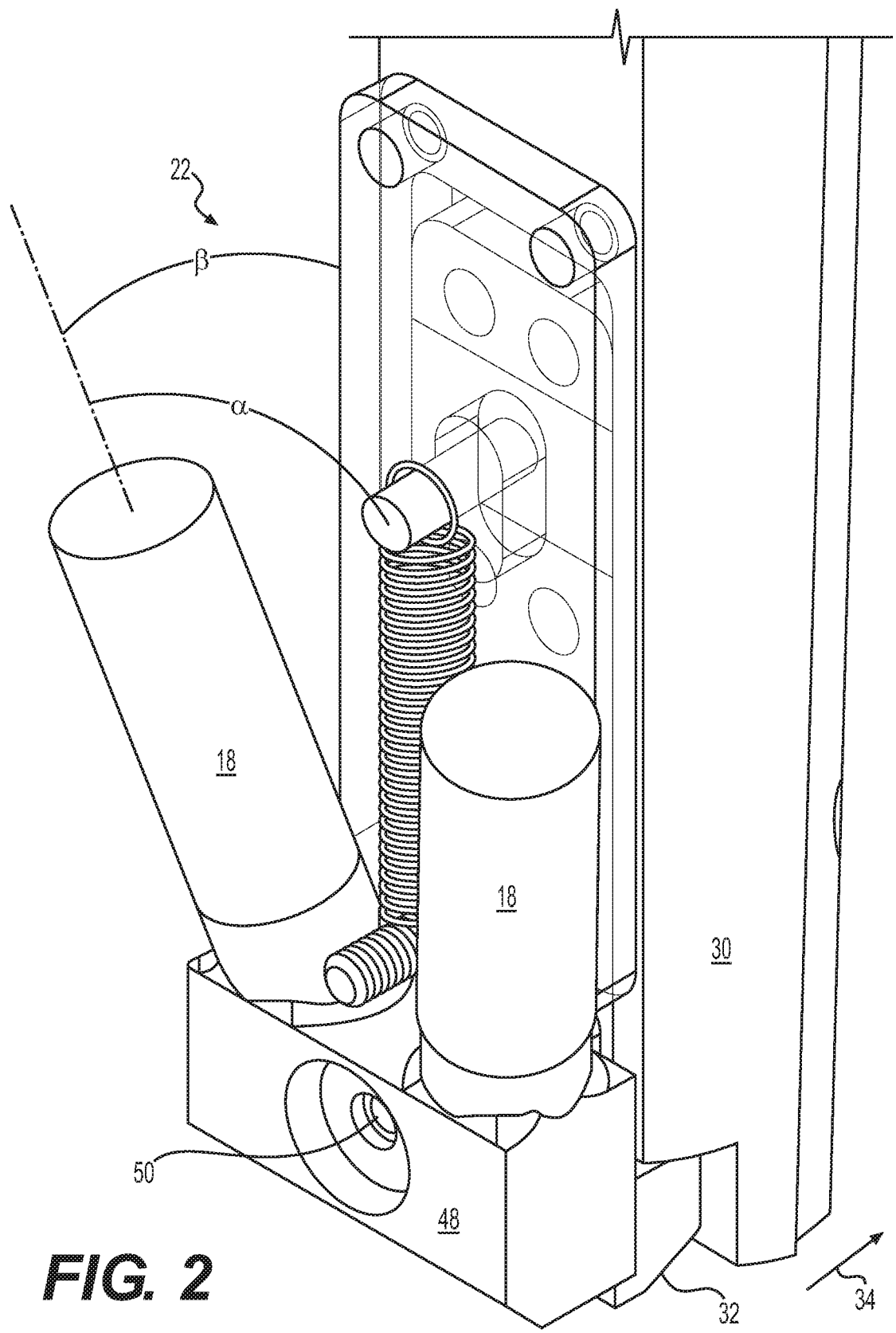
FIGS. 2 and 3 are diagrammatic illustrations of exemplary disclosed portions of the system of FIG. 1.

As shown in FIG. 2, outlet 22 may be an assembly of components that cooperate to accurately place matrix-wetted reinforcement(s) and thereby form structure 12 (referring to FIG. 1). These components may include, among other things, a guide or nozzle 30 located downstream of wetting mechanism 26 (referring to FIG. 1), and a compactor 32 that trails nozzle 30 (e.g., relative to a normal travel direction of head 16 during material discharge, as represented by an arrow 34). It is contemplated that either of nozzle 30 or compactor 32 may function as a tool center point (TCP) of head 16, to position the matrix-wetted reinforcement(s) prior to curing when exposed to energy by cure enhancer(s) 18.

During discharge of material from head 16, the matrix-wetted reinforcement(s) may pass through one or more features (e.g., channels, grooves, protrusions, etc.) of nozzle 30 that help to maintain desired trajectories (e.g., separation between adjacent reinforcements, straightness, and/or steering onto compactor 32) of the reinforcement(s). Compactor 32 may pass over the matrix-wetted reinforcement(s) discharging from nozzle 30 and thereby urge the reinforcement(s) against an underlying surface with a desired pressure. Cure enhancer(s) 18 may direct cure energy (e.g., UV and/or laser light) through and/or to a point on the discharging material that is immediately behind compactor 32 (e.g., relative to the normal travel direction).

Figure 3:
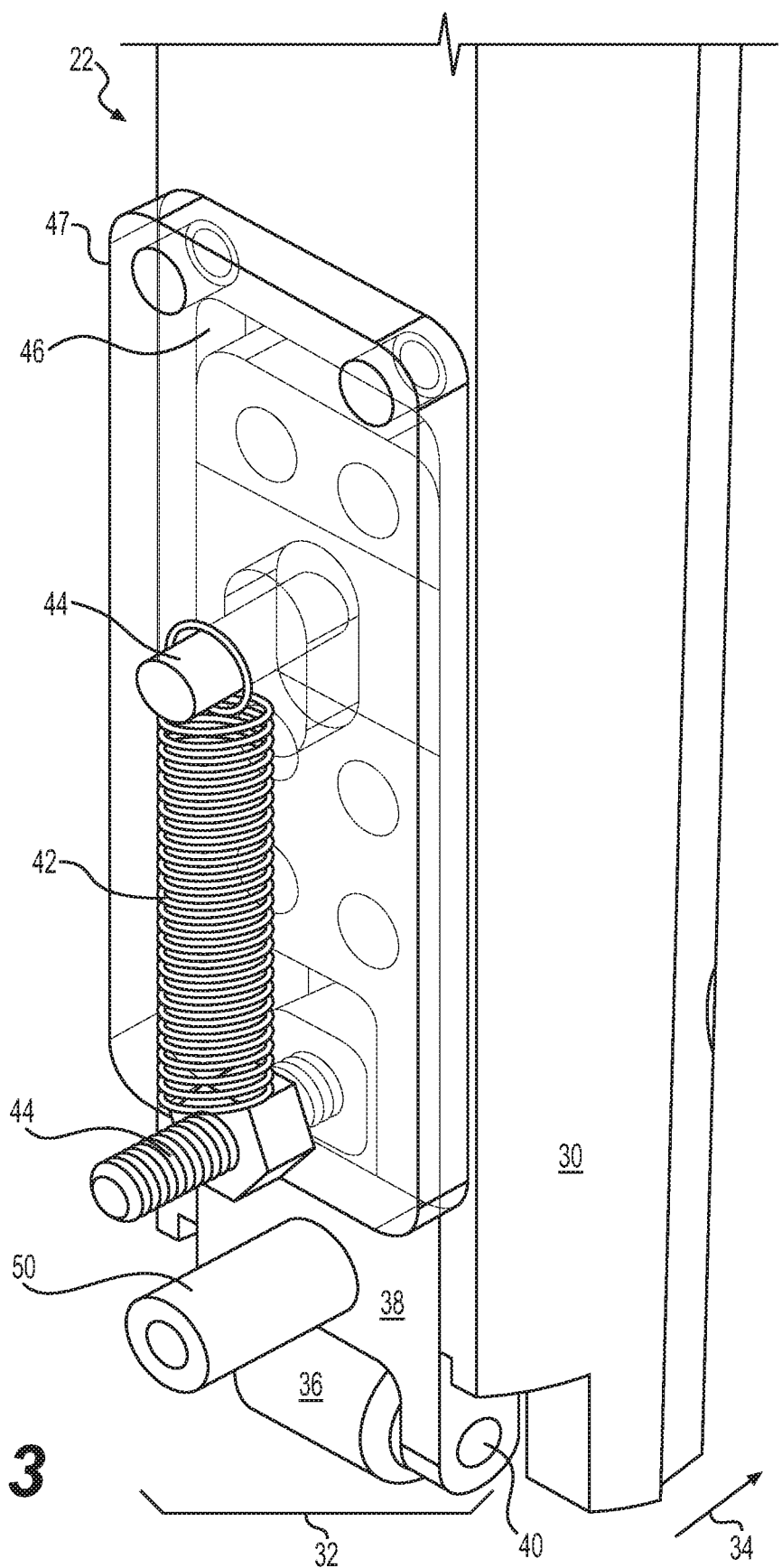

Cure enhancer(s) 18 have been omitted from FIG. 3, for purposes of clarity. As can be seen in FIG. 3, compactor 32 may include a roller 36 that is rotationally mounted within a bracket 38 via an axle 40. Roller 36 may be configured to roll over the material discharging from nozzle 30 (e.g., after the material has bent through about 90° to overlap an underlying surface) as bracket 38 and axle 40 are translated together with nozzle 30 in the normal travel direction of head 16 (e.g., in the direction of arrow 34) by support 14 (referring to FIG. 1), due to moments created within roller 36 by the translation. Bracket 38 (along with roller 36 and axle 40) may be urged in a material discharge direction (e.g., in an axial direction of nozzle 30) by a spring 42 that extends between nozzle 30 and bracket 38 (e.g., between fixed or adjustable studs 44 that extend from nozzle 30 and bracket 38). The stud 44 of nozzle 30 may be assembled closer to the discharging material than the stud 44 of bracket 38, such that the bias of spring 42 functions to pull studs 44 closer to each other.

In the depicted embodiment, bracket 38 is an elongated plate contained within a groove or channel 46 formed at a back side of nozzle 30 by way of a cover 47. The plate portion of bracket 38 may be disposed at least partially within and allowed to slide axially relative to channel 46, and cover 47 may close off an open side of channel 46 to capture the plate portion of bracket 38 within channel 46. In this configuration, spring 42 may be a tension-spring, configured to extend the plate portion of bracket 38 out of channel 46 by pulling of studs 44 towards each other. It is contemplated, however, that other configurations capable of urging compactor 32 towards the discharging material may also be possible.

Cure enhancers 18 are represented in FIG. 2 by truncated optical tubes, which can be mounted to compactor 32 via a bracket 48. Any number of (e.g., two) cure enhancers 18 may terminate at bracket 48, and bracket 48 may connect to compactor 32 via a stud 50 that protrudes rearwardly (e.g., from bracket 38). In this manner, movement of compactor 32 in the axial direction of nozzle 30 may result in corresponding movement of bracket 48 and cure enhancer(s) 18. These co-movements may allow for a desired level of cure energy intensity to always be maintained at a desired distance from the material being discharged and compacted.

It should be noted that, when two cure enhancers 18 are included, the associated optical tubes may be tilted towards each other and/or towards roller 36. For example, the optical tubes may be located at opposing sides of the continuous reinforcement and tilted transversely towards each other at an angle $\alpha$ relative to a normal of the continuous reinforcement at a location of energy exposure. In one embodiment, the tilt angle $\alpha$ may be about 5-60°. The optical tubes may additionally or alternatively be tilted in the normal travel direction of head 16 (e.g., in the direction of arrow 34 towards roller 36) at an angle $\beta$ relative to the normal of the continuous reinforcement at the location of energy exposure. In one embodiment, the tilt angle $\beta$ may be about 5-45°. This tilting may help to ensure that the matrix wetting the continuous reinforcement is exposed to energy on multiple sides (e.g., at least two sides and, in some applications three sides) and as close to the tool center point as possible. This exposure may help to quickly tack the reinforcement more accurately at a desired location.

Compactor 32 and cure enhancer(s) 18 may be selectively extended in the axial direction of nozzle 30. For example, a pneumatic piston (not shown) could be located to generate extending forces on bracket 38 (e.g., on stud 44 of bracket 38 and/or nozzle 30). Alternative, a motor/screw arrangement, a solenoid, and/or gravity could be connected to generate these extending forces. Other extending devices could also be utilized. It is contemplated that spring 42 may be omitted in some applications, and the associated extending device further operated to retract compactor 32. For example, a double acting pneumatic cylinder may be utilized to extend and retract compactor 32.

INDUSTRIAL APPLICABILITY

The disclosed system may be used to manufacture composite structures having any desired cross-sectional shape and length. The composite structures may include any number of different fibers of the same or different types and of the same or different diameters, and any number of different matrixes of the same or different makeup. Operation of system 10 will now be described in detail.

At a start of a manufacturing event, information regarding a desired structure 12 may be loaded into system 10 (e.g., into controller 28 that is responsible for regulating operations of support 14 and/or head 16). This information may include, among other things, a size (e.g., diameter, wall thickness, length, etc.), a contour (e.g., a trajectories, surface normal, etc.), surface features (e.g., ridge size, location, thickness, length; flange size, location, thickness, length; etc.), connection geometry (e.g., locations and sizes of couplings, tees, splices, etc.), reinforcement selection, matrix selection, discharge locations, severing locations, etc. It should be noted that this information may alternatively or additionally be loaded into system 10 at different times and/or continuously during the manufacturing event, if desired. Based on the component information, one or more different reinforcements and/or matrix materials may be installed and/or continuously supplied into system 10.

To install the reinforcements, individual fibers, tows, and/or ribbons may be passed through matrix reservoir 24 and outlet 22 (e.g., through features of nozzle 30, and under compactor 32). In some embodiments, the reinforcements may also need to be connected to a pulling machine (not shown) and/or to a mounting fixture (e.g., to the anchor point). Installation of the matrix material may include filling head 16 (e.g., wetting mechanism 26 of reservoir 24) and/or coupling of an extruder (not shown) to head 16.

The component information may then be used to control operation of system 10. For example, the in-situ wetted reinforcements may be pulled and/or pushed from outlet 22 of head 16 as support 14 selectively moves (e.g., based on known kinematics of support 14 and/or known geometry of structure 12), such that the resulting structure 12 is fabricated as desired.

Operating parameters of support 14, cure enhancer(s) 18, compactor 32, and/or other components of system 10 may be adjusted in real time during material discharge to provide for desired bonding, strength, tension, geometry, and other characteristics of structure 12. Once structure 12 has grown to a desired length, structure 12 may be severed from system 10.

It will be apparent to those skilled in the art that various modifications and variations can be made to the disclosed system. Other embodiments will be apparent to those skilled in the art from consideration of the specification and practice of the disclosed system. For example, it is contemplated that cure enhancer(s) 18 could additionally move somewhat or completely independent of compactor 32 (e.g., in the axial direction of the material passing through guide 30), at the same time that both of cure enhancer(s) 18 and compactor 32 move independent of guide 30. It is intended that the specification and examples be considered as exemplary only, with a true scope being indicated by the following claims and their equivalents.

What is claimed is:

1. An additive manufacturing system, comprising:
 a support; and
 a print head configured to discharge a material, the print head being operatively connected to and moveable by the support during discharge of the material, the print head including:
 an outlet configured to discharge the material to form a surface;
 an actuator;
 a compactor connected to the actuator and being configured to compact the surface, the actuator being configured to translate the compactor in a direction substantially perpendicular to the surface; and
 at least one cure enhancer connected to the compactor and configured to translate with the compactor, the at least one cure enhancer configured to expose the surface to a cure energy.

2. The additive manufacturing system of claim 1, wherein the compactor includes:
 a bracket;
 a roller; and
 an axle rotationally connecting the roller to the bracket.

3. The additive manufacturing system of claim 2, wherein the at least one cure enhancer is connected to the bracket.

4. The additive manufacturing system of claim 1, wherein the at least one cure enhancer includes at least one optical tube configured to transmit light energy.

5. The additive manufacturing system of claim 1, further including a wetting mechanism located upstream of the outlet, the wetting mechanism configured to wet the material with a liquid matrix that is curable by the cure energy.

6. The additive manufacturing system of claim 1, wherein:
 the at least one cure enhancer includes a first cure enhancer and a second cure enhancer; and
 the first cure enhancer and the second cure enhancer are oriented at an angle between approximately 5-60° relative to a normal plane extending through the material at a location of cure energy exposure.

7. The additive manufacturing system of claim 6, wherein the first cure enhancer and the second cure enhancer are oriented toward the compactor at an angle between approximately 5-45° relative to the normal plane extending through the material at the location of cure energy exposure.

8. The additive manufacturing system of claim 1, wherein the at least one cure enhancer is fixedly connected to the compactor.

9. An additive manufacturing system, comprising:
 a nozzle configured to discharge a continuous reinforcement at least partially wetted with a matrix;
 a compactor configured to apply a pressure to the continuous reinforcement at least partially wetted with the matrix after discharge from the nozzle;
 at least one cure enhancer configured to expose the matrix to a cure energy; and
 an actuator operably connected to the compactor, wherein the actuator is configured to collectively move the at least one cure enhancer and the compactor relative to the nozzle and in a direction that is substantially parallel with the pressure applied by the compactor.

10. The additive manufacturing system of claim 9, wherein:
 the at least one cure enhancer includes a first cure enhancer and a second cure enhancer; and
 the first cure enhancer and the second cure enhancer are disposed between approximately 5-60° relative to a normal plane extending through the continuous reinforcement at a location of cure energy exposure.

11. The additive manufacturing system of claim 10, wherein the first cure enhancer and the second cure enhancer are oriented toward the compactor at an angle between approximately 5-45° relative to the normal plane extending through the continuous reinforcement at the location of cure energy exposure.

12. The additive manufacturing system of claim 9, wherein the at least one cure enhancer is tilted toward the compactor at an angle between approximately 5-45° relative to a normal plane extending through the continuous reinforcement at a location of cure energy exposure.

13. The additive manufacturing system of claim 9, wherein the at least one cure enhancer is connected to the compactor.

14. The additive manufacturing system of claim 9, wherein:
 the compactor includes a roller configured to apply the pressure to the continuous reinforcement; and
 the at least one cure enhancer is configured to expose the matrix to the cure energy at least one of:
 after compaction by the roller, or
 during the compaction by the roller.

15. The additive manufacturing system of claim 9, further comprising a bracket, wherein:
 the actuator connects to the bracket;
 the compactor connects to the bracket; and
 the at least one cure enhancer connects to the bracket.

16. A system, comprising:

a support; and a print head being operatively connected to and moveable by the support, the print head, comprising:

a dispensing module having an outlet configured to discharge a continuous reinforcement;

an actuator;

a compacting module connected to the actuator, the actuator being configured to cause the compacting module to apply a force to compact the continuous reinforcement discharged from the outlet; and a cure enhancer connected to and movable with the compacting module in a direction that is substantially parallel with the force applied by the compacting module, the cure enhancer being configured to direct cure energy to the continuous reinforcement.

17. The system of claim 16, wherein:

a first plane extends through the dispensing module;

a second plane extends through the dispensing module, the second plane being substantially orthogonal to the first plane; and the cure enhancer is at least one of:

oriented towards the first plane, or oriented towards the second plane.

18. The system of claim 16, wherein at least one of:

the compacting module includes a roller configured to compact the continuous reinforcement;

the cure enhancer is configured to direct cure energy to the continuous reinforcement after compaction by the roller; or the cure enhancer is configured to direct the cure energy to the continuous reinforcement during compaction by the roller.

19. The system of claim 16, wherein:

the print head is moveable by the support in a first direction during discharge of the continuous reinforcement; and the actuator is moveable in a second direction that is substantially orthogonal to the first direction during discharge of the continuous reinforcement.

* * * * *